United States Patent
Chevet et al.

(10) Patent No.: US 6,621,898 B1
(45) Date of Patent: Sep. 16, 2003

(54) METHOD OF COMMUNICATION BETWEEN AN AUTOMATIC BRANCH EXCHANGE AND A MESSAGING SYSTEM PROVIDING AT LEAST ONE VOICE SERVICE, AUTOMATIC BRANCH EXCHANGE AND MESSAGING SYSTEM IMPLEMENTING A METHOD OF THIS KIND

(75) Inventors: Jean-Luc Chevet, Laval (FR); Alain Demoulian, Dinan (FR)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/496,682

(22) Filed: Feb. 3, 2000

(30) Foreign Application Priority Data

Feb. 11, 1999 (EP) ............................................. 99460009

(51) Int. Cl.$^7$ ................................................ H04M 7/00
(52) U.S. Cl. .................................. 379/230; 379/201.01
(58) Field of Search ....................... 379/201.01, 201.05, 379/88.25, 93.01, 230; 370/271, 524

(56) References Cited

U.S. PATENT DOCUMENTS

| 4,587,651 A | * | 5/1986 | Nelson et al. |
| 4,723,273 A | * | 2/1988 | Diesel et al. ................ 379/211 |
| 5,195,128 A | | 3/1993 | Knitl ............................ 379/67 |
| 5,263,080 A | | 11/1993 | Jones et al. .................... 379/88 |
| 5,412,660 A | * | 5/1995 | Chen et al. ............... 370/110.1 |
| 5,652,576 A | | 7/1997 | Inokuma et al. ........ 340/825.79 |
| 5,761,294 A | * | 6/1998 | Shaffer et al. .............. 349/230 |
| 6,115,603 A | * | 9/2000 | Baird et al. .................. 379/201 |
| 6,138,015 A | * | 10/2000 | Langmantel ................ 455/432 |

\* cited by examiner

Primary Examiner—Creighton Smith
(74) Attorney, Agent, or Firm—David Volejnicek

(57) ABSTRACT

A method and apparatus for communication between an automatic branch exchange and a messaging system using a signaling channel. The signaling channel bearing at least some of the signaling exchanges between the automatic branch exchange and the messaging system. The automatic branch exchange and the messaging system are also interconnected by voice channels so as to implement voice services on the messaging system. The signaling channel is distinct from the voice channels.

23 Claims, 1 Drawing Sheet

METHOD OF COMMUNICATION BETWEEN AN AUTOMATIC BRANCH EXCHANGE AND A MESSAGING SYSTEM PROVIDING AT LEAST ONE VOICE SERVICE, AUTOMATIC BRANCH EXCHANGE AND MESSAGING SYSTEM IMPLEMENTING A METHOD OF THIS KIND

FIELD OF THE INVENTION

The present invention generally relates to messaging systems, and, more particularly, to messaging systems within telecommunications systems.

BACKGROUND OF THE INVENTION

In general, a messaging system enables the storage and supply of information to users in deferred mode and/or in immediate mode. Typically, a messaging system interconnected with an automatic branch exchange by at least one voice channel, so as to provide at least a voice service to user terminals connected to the automatic branch exchange. The term <<voice services>> is understood to mean any type of service based on the exchange of voice messages (also called audio messages) such as, for example, but not exclusively, mailboxes, announcements and automatic switchboard services.

A messaging system can also provide non-voice services based for example on the exchange of textual messages and/or image messages, or it can provide multimedia type services combining several types of messages.

An automatic branch exchange enables communications to be set up between two items of equipment located at distinct points in a network. The installations that are linked up are, for example, two user terminals or else one user terminal and one messaging system. The term <<user terminal>> refers especially but not exclusively to simple telephone sets and telephone sets providing enhanced functions (with screens).

A distinction is generally made between public automatic branch exchanges, which form part of the general telecommunications network, and private automatic branch exchanges or PABXs which do not form part of the network but fulfil the same functions (namely that of setting up communication between users of the network or networks).

Exchanges of service information required for inter-operation (or inter-operability) between the automatic branch exchange and the messaging system are referred to as signaling exchanges. Conventionally, these signaling exchanges are carried out on the voice channel (or one of the voice channels) interconnecting the automatic branch exchange and the messaging system. Indeed, the signaling messages are sent and received in the form of DTMF (dual tone multifrequency). Each signaling message consists of one or more DTMF codes assembled in a predetermined combination, generally proper to each messaging system provider. Each DTMF is itself defined by a pre-determined association of two voice frequencies (a high frequency and a low frequency). These values of frequencies are chosen so as to minimize the risk that each association resembles the breakdown of the voice.

This current approach, based on the transmission of DTMF codes in a voice channel, has many drawbacks.

First of all, the transmission of DTMF codes "pollutes" the voice channel whose primary function is the transmission of the voice.

Furthermore, the signaling transmission bit rate is limited to the bit rate of the voice channel used (which is generally 64 bits/second). In other words, the signaling exchanges between the automatic branch exchange and the messaging system, which are obligatorily designed as a function of the available bit rate, are restricted. This results especially in poor quality dialog (voice menus) and low-level information exchanges between the automatic branch exchange and the messaging system. This observation (poor quality dialog and low-level information exchange) can also be applied to a call, through the automatic branch exchange, between the messaging system and a subscriber terminal after a service of the messaging system has been started.

Additionally, security is reduced owing to the fact that signaling takes the same channel (and hence the same routing path) as the voice and that it is therefore impossible to transmit error or alarm messages once the voice channel is out of service.

Moreover, the coexistence of two types of information (namely voice information and signaling information) within one and the same voice channel is difficult to manage and can even prevent certain types of actions. Indeed, it is impossible to make only voice information undergo compression or again to make the signaling information undergo a different compression. Similarly, it is impossible to make only the voice information undergo encryption. Furthermore, the signaling information should be capable of being transmitted at any time.

Finally, in certain countries, especially Eastern Europe, the voice is sometimes identified with certain DTMF codes and generates false DTMF codes. These false DTMF codes then prompt errors in the signaling exchanges between the automatic branch exchange and the messaging system.

The invention is designed to overcome these different drawbacks of the prior art.

More specifically, one of the aims of the present invention is to provide a method of communication between an automatic branch exchange and a messaging system enabling an improvement in communication between these two elements and therefore an increase in the synergy between their functions.

It is also an aim of the invention to provide a method of this kind that enables an improvement in communication, through the automatic branch exchange, between the messaging system and a subscriber terminal after a service has been started by the messaging system.

Another goal of the invention is to provide a method of this kind enabling a dynamic allocation of resources of the messaging system.

An additional goal of the invention is to provide a method of this kind enabling the creation and implementation of a generic signaling protocol between the automatic branch exchange and the messaging system.

Yet another goal of the invention is to provide an automatic branch exchange and a messaging system enabling the implementation of a method of communication of this kind.

SUMMARY OF THE INVENTION

The above goals, as well as others goals, are achieved according to the invention by using at least one signaling channel to interconnect an automatic branch exchange and a messaging system. The automatic branch exchange and the messaging system being also interconnected by at least one voice channel so as to implement the at least one voice service on the messaging system. The signaling channel is distinct from the at least one voice channel. The signaling channel at least partially bearing signaling exchanges between the automatic branch exchange and the messaging system.

The invention modifies the communication interface between the automatic branch exchange and the messaging system by adding at least one signaling channel in parallel with the commonly used voice channels. In this way, the automatic branch-exchange and the messaging system can exchange signaling without any voice channel being <<polluted>> by DTMF codes. More generally, the present invention makes it possible to overcome all the above-mentioned drawbacks directly related to the use of the DTMF codes. In particular, since the signaling transmission bit rate is independent of the voice transmission bit rate, the signaling transmission bit rate may be as high as desired. An increase of this kind in the quantity of signaling exchanged makes it possible to increase the synergy between the automatic branch exchange and the messaging system. It provides, for example, for a dynamic allocation of resources of the messaging system. It also enables the designing of extensive and highly developed forms of dialog as well as fuller exchanges of information between the automatic branch exchange and the messaging system. This extensive range of communication may also be of benefit to exchanges between the messaging system and the user terminal when these units communicate through the automatic branch exchange after a service of the messaging system has been started. These extensive and highly developed forms of dialog are obtained, for example, if the user terminal has a screen and a keyboard, in the form of visual scrolling menus. Indeed, these menus are far more user-friendly and much faster to use than the currently proposed voice menus.

Furthermore, the same automatic branch exchange can be interconnected to several messaging systems. In this case, it is enough to apply the method according to the present invention for each of the distinct messaging systems interconnected with the automatic branch exchange.

Preferably, the signaling channel is a digital type channel.

Also preferably, a generic signaling protocol is implemented in the at least one signaling channel. The generic character of this signaling protocol makes it usable with all types of automatic branch exchanges and messaging systems. It is therefore not a "manufacturer protocol" related to a particular type of system.

The generic signaling protocol may include a normal phase of operation during which the automatic branch exchange and the messaging system implement at least one predetermined signaling exchange. The generic signaling protocol may further include an initializing phase during which the messaging system transfers an image of its current configuration to the automatic branch exchange so that the automatic branch exchange adapts its operation to that of the messaging system. The knowledge by the automatic branch exchange of the current configuration of the messaging system enables the automatic branch exchange to optimize its inter-functioning with the messaging system, especially when a user terminal asks for access to one of the services of the messaging system.

Advantageously, during the initializing phase, the automatic branch exchange transfers an image of its current configuration to the messaging system so that the messaging system adapts its operation to that of the automatic branch exchange. The knowledge, on the part of the messaging system, of the current configuration of the automatic branch exchange enables the messaging system to optimize its inter-functioning with the automatic branch exchange.

Preferably, the image of the current configuration of the messaging system and/or the image of the current configuration of the automatic branch exchange are images according to object-oriented models.

According to an embodiment of the invention, the at least one voice channel also bears a part of the signaling exchanges.

In a preferred embodiment of the invention, the automatic branch exchange and the messaging system exchange signaling messages on at least one signaling channel within the framework of the generic signaling protocol. The signaling messages include:
  a "class" field enabling the identification of one class in a group of at least one possible class;
  an "instance" field that is either not defined or enables the identification of a particular instance in a group of at least one possible instance for the identified class in the "class" field;
  a "nature of message" field enabling the identification of a nature of the message from a group of least one nature of message possible for the identified class in the "class" field;
  possibly a "parameter(s)" field that is either not defined or enables the identification of at least one parameter associated with the nature of message identified in the "nature of message" field.

This message structure makes it possible to create a very large number of distinct signaling messages and facilitate their processing.

BRIEF DESCRIPTION OF THE DRAWINGS

Other characteristics and advantages of the invention shall appear from the following description of a preferred embodiment of the invention, given by way of an exemplary non-restrictive indication and from the appended drawings, of which.

DETAILED DESCRIPTION

The invention relates to a method of communication between an automatic branch exchange and a messaging system providing at least one voice service. More specifically, the invention relates to signaling exchanges between the automatic branch exchange and the messaging system, namely exchanges of service information required for inter-operation (or inter-operability) between these two installations.

As described above, an automatic branch exchange enables communications to be set up between two items of equipment located at distinct points in a network. The installations that are linked up are, for example, two user terminals or else one user terminal and one messaging system. In the present invention, special interest is taken in the latter. Furthermore, a distinction is generally made between public automatic branch exchanges, which form part of the general telecommunications network, and private automatic branch exchanges or PABXs which do not form part of the network but fulfil the same functions (namely that of setting up communication between users of the network or networks). The present invention is not limited to a particular type of automatic branch exchange.

In the present invention, it is assumed that the messaging system is interconnected with an automatic branch exchange by at least one voice channel, so as to provide at least a voice service to user terminals connected to the automatic branch exchange. The term <<voice services>> is understood to mean any type of service based on the exchange of voice messages (also called audio messages) such as, for example, but not exclusively, mailboxes, announcements and automatic switchboard services.

It is clear that, while remaining within the framework of the present invention, a messaging system can also provide non-voice services based for example on the exchange of textual messages and/or image messages or again it can provide multimedia type services combining several types of messages.

Figure 1:
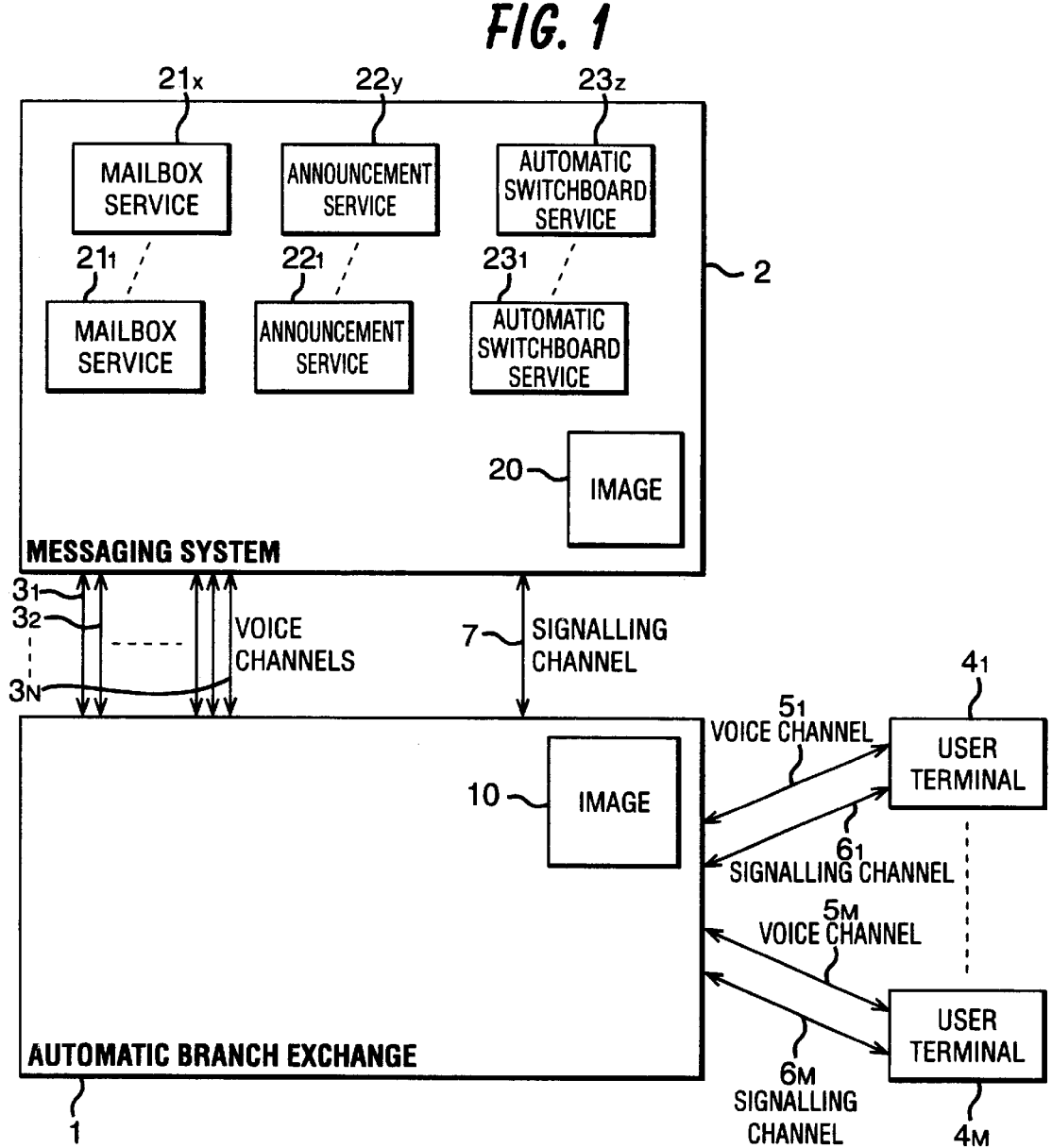
FIG. 1 shows a messaging system and an automatic branch exchange communicating together according to the method of the invention.

As shown in FIG. 1, the automatic branch exchange 1 and the messaging system 2 are interconnected by N voice channels $3_1$ to $3_N$. The messaging system 2 provides, for example, the following services:

mailbox services $21_1$ to $21_x$. The mailboxes are containers of voice messages. The voice messages may be inserted or removed from the mailboxes by the messaging system through appropriate sessions created by the automatic branch exchange such as, for example, "answering" sessions or "mailbox consultation" sessions;

announcement services $22_1$ to $22_y$. The announcements are audio fragments (speech and/or music) which can be accessed in listening mode through an appropriate session created by the automatic branch exchange; and automatic switchboard services $23_1$ to $23_z$. The automatic switchboard are voice applications responsible for receiving calls and making transfers according to the choice of the calling person. They can be accessed through an appropriate session created by the automatic branch exchange.

The automatic branch exchange 1 is interconnected with a plurality of user terminals $4_1$ to $4_M$. In the example shown, each user terminal is connected to the automatic branch exchange by means of a voice channel $5_1$ to $5_M$ and a signaling channel $6_1$ to $6_M$. It is indeed assumed that the user terminals $4_1$ to $4_M$ are of the type comprising a keyboard and a display screen. They are sometimes called "enhanced function owner stations". The voice channels $3_1$ to $3_N$ between the automatic branch exchange 1 and the messaging system 2 and $5_1$ to $5_M$ between the automatic branch exchange 1 and the user terminals $4_1$ to $4_M$ are for example 64 bits/s channels.

In a manner specific to the present invention, the automatic branch exchange 1 and the messaging system 2 are furthermore interconnected by at least one signaling channel 7, for example of the digital type. This signaling channel 7 for example bears a part of the signaling exchanges between the automatic branch exchange 1 and the messaging system 2, the other part being borne, conventionally (with the use of DTMF codes), by one of the voice channels $3_1$ to $3_N$ interconnecting the automatic branch exchange 1 and the messaging system 2. With this combined approach (signaling channel/voice channel), the signaling exchange between the automatic branch exchange and the messaging system can be divided as follows:

a first part of the signaling is exchanged in a "novel manner" through the signaling channel interconnecting the automatic branch exchange and the messaging system. This first part corresponds for example to the signaling related to the inter-functioning between the automatic branch exchange and the messaging system;

a second part of the signaling is exchanged "traditionally" (for example with DTMF codes) through the voice channel interconnecting the automatic branch exchange and the messaging system. This second part corresponds, for example, to the signaling linked to a call set up between the messaging system and a user terminal, in the context of access by the user terminal to a service of the messaging system.

According to one variant, the totality of the signaling system is borne by the signaling channel 7.

A description is now given of a particular embodiment of a generic signaling protocol implemented in the signaling channel 7 interconnecting the automatic branch exchange 1 and messaging system 2.

In this particular embodiment, the generic signaling protocol includes an initializing phase and a normal operating phase. During the initializing phase, the automatic branch exchange 1 receives from the messaging system 2 an image 10 of the current configuration of this messaging system. This image 10 may be based at least partly on a first predetermined object-oriented model. The automatic branch exchange 1 subsequently uses this image 10 in order to adapt its operation to that of the messaging system 2. The knowledge by the automatic branch exchange of the current configuration of the messaging system enables the automatic branch exchange to optimize its inter-functioning with the messaging system, especially when a user terminal asks for access to one of the services of the messaging system. For example, it is important that the automatic branch exchange should know that a mailbox that a user wishes to access is no longer in existence. Indeed, with this knowledge, the automatic branch exchange can meet the request of the user without unnecessarily accessing the messaging system.

The messaging system 2 receives an image 20 of its current configuration from the automatic branch exchange 1. This image 20 may be based partly on a second predetermined object-oriented model. The messaging system 2 uses this image 20 in order to adapt its operation to that of the automatic branch exchange 1.

During the normal operating phase, the automatic branch exchange 1 and the messaging system 2 implement different types of signaling exchanges (see the different examples given in detail here below with reference to Appendix 2). The signaling exchange implemented using the normal phase may include exchanges belonging to the following group of types of exchanges:

the updating and/or reconfiguring of the messaging system by the automatic branch exchange;

the starting/stopping of a voice service by the automatic branch exchange and/or the messaging system;

the dynamic notification, to the automatic branch exchange, of a modification of the configuration of the messaging system so as to update an image of the current configuration of the messaging system in the automatic branch exchange;

a request by the messaging system for the starting of a call service by the automatic branch exchange;

a request by the messaging system for a call transfer by the automatic branch exchange;

a request by the automatic branch exchange for the sending of at least one echo message by the messaging system;

the sending by the messaging system of at least one debugging message to the automatic branch exchange.

This list is not exhaustive.

Among the modifications of configuration that can be notified to the automatic branch exchange by the messaging system, we may refer for example only to:

the creation or deletion of a mailbox;

the creation or deletion of an announcement;

the creation or deletion of an automatic exchange;

the assigning of an extension number to a mailbox the recording or erasure of an announcement;

the filing or elimination of a voice message in a mailbox;

etc.

In the context of this generic signaling protocol, the messaging system 2 and the automatic branch exchange 1 send/receive signaling messages on the signaling channel 7.

Figure 2:
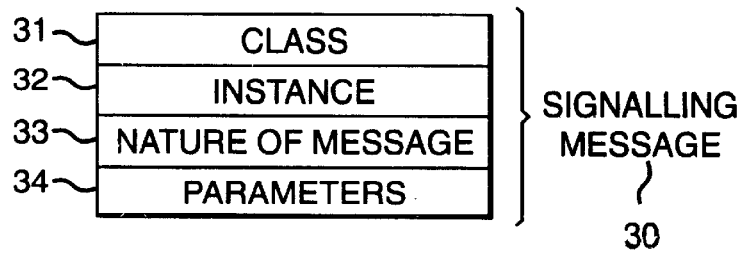
FIG. 2 shows a particular embodiment of a structure of a signaling message according to the present invention.

A description is now given, with reference to FIG. 2, of a particular embodiment of a signaling message structure according to the present invention, common to all the signaling messages exchanged. This signaling message 30 comprises:

- a "class" field 31 encoded for example on a byte. It enables the identifications of one class among a plurality of classes possible;
- an "instance" field 32 encoded for example on two bytes. Either it is not defined or it enables the identification of a particular instance from a plurality of possible instances for the class identified in the "class" field 31;
- a "nature of message" field 33, encoded for example on one byte. It enables the identification of a nature of message from a plurality of natures of message possible for the class identified in the "class" field 31;
- a "parameter(s)" field 34 encoded for example on n bytes. Either it is not defined or it enables the identification of at least one parameter associated with the nature of message identified in the "nature of message" field 33.

Preferably, the class identified in the "class" field can be a class belonging to the following group:

- the "supervision" class concerning the supervision of the messaging system;
- the "system" class concerning the configuration of the messaging system;
- the "port" class concerning the activation of voice services and the detection of tone on the ports;
- the "mailbox" class concerning the description of mailboxes;
- the "announcement" class concerning the description of announcements;
- the "tonedetector" class concerning the detection of tone.

Preferably, the nature of the message identified in the "nature of message" field belongs to the following group:

an indication of presence/absence of messaging;

the detection of type of messaging;

a request for service;

the opening/closing of a service session;

the creation/deletion of a voice announcement;

recording/playing of a voice announcement;

creation/deletion of a mailbox;

opening/closing of a mailbox;

consultation of the messages of a mailbox;

recording/playing of messages of a mailbox;

definition of the voice channels;

telephone functions enabling exchanges of signals relating to the setting up and releasing of a call;

information on types of call;

identification and/or authentication of the called and calling parties;

routing of a call;

call transfer;

etc.

Appendix 1 of the present description provides a synthesis, in table form, of an exemplary set of messages. For each of the six classes proposed in the first column ("Supervision", "System", "Port, "Mailbox", "Announcement" and "ToneDetector") the second column indicates the different natures of message possible, described in a specific language and developed by the Applicant. Furthermore, the third column indicates that it is a message sent on the Up channel from the messaging system 2 to the automatic branch exchange 1 or a message sent on the Down channel from the automatic branch exchange to the messaging system 2. Finally, the fourth column indicates the value associated with each message.

A brief description is now given of the different messages listed in Appendix 1. For purposes of simplification, hereinafter the name of the message and the name of the nature of this message are deliberately identified.

"GetHardwareVersion": the automatic branch exchange sends this message to obtain the hardware version of the messaging system. The messaging system responds by sending a "HardwareVersion" message.

"GetSoftwareVersion": the automatic branch exchange sends this message to obtain the software version of the messaging system. The messaging system responds by sending a "SoftwareVersion".

"GetPortCount": the automatic branch exchange sends this message to obtain the number of ports borne by the messaging system. The messaging system responds by sending a "PortCount" message.

"AssignTimeSlot": the automatic branch exchange sends this message to assign a time slot to a given port.

"SystemReady": the automatic branch exchange sends this message as soon as it is ready to receive messages. The automatic branch exchange sends no message to the messaging system so long as it has not received this message.

"Rebuild": the automatic branch exchange sends this message to obtain a full description of the configuration of the messaging system. The messaging system responds by sending a series of messages of which the last one is "RebuildDone".

"GetSystemImage": the automatic branch exchange sends this message to obtain the capacities of the messaging system. This messaging system responds by sending a "SystemImage" message.

"SetPreferences": the automatic branch exchange sends this message to define its application preferences (encoding law, language, etc.).

"ChangeLanguages": the automatic branch exchange sends this message to modify the primary and secondary languages used by the messaging system.

"UpdateDataAndTime": the automatic branch exchange sends this message to achieve a dynamic modification of the date and time on the messaging system.

"SelectDayOrNightMode": the automatic branch exchange sends this message to ask the messaging system to work in "day mode" or "night mode".

"StartSystem": the automatic branch exchange sends this message to inform the messaging system that it can start working.

"FindExtensionNumber": the messaging system sends this message to ask the automatic branch exchange to validate an extension number entered by the user. In the event of positive validation, the automatic branch exchange responds by the "ExtensionNumberFound" message and, if not, by the "ExtensionNumberNotFound" message.

"EchoMessage": the automatic branch exchange sends this message in the framework of tests. The messaging system responds by the message "MessageEchoed".

"DebugMessage": the messaging system sends this message to transmit debugging information to the automatic branch exchange.

"FindMailBox": the messaging system sends this message to ask the automatic branch exchange to find a mailbox having a specified extension number as a parameter of this message. The automatic branch exchange responds with the "MailBoxFound" message or "MailBoxNotFound" depending on whether or not it has found this mailbox.

"AssignExtensionToMailBox": the messaging system sends this message to ask the automatic branch exchange to assign an extension number to a mailbox. The automatic branch exchange responds with the message "AssignmentAccepted" or "AssignmentRefused" depending on whether the assignment has been accepted or refused.

"FindNumberOfMailBoxAssigned": the messaging system sends this message to ask the automatic branch exchange the number of mailboxes assigned (namely which of them has an extension number and which of them is really used by the automatic branch exchange). The automatic branch exchange responds with the message "NumberOfMailBoxAssigned" which gives the requested number as a parameter.

"FindMailBoxExtension": the messaging system sends this message to ask the automatic branch exchange that is the extension number assigned to a mailbox. The automatic branch exchange responds with the message "MailBoxExtensionFound" or the message "MailBoxExtensionNotFouind" depending on whether or not an extension number has been assigned to this mailbox.

"MailBoxCreated": the messaging system sends this message to inform the automatic branch exchange of the creation of a mailbox, and also sends it in response to each "Rebuild" message.

"MailBoxDeleted": the messaging system sends this message to inform the automatic branch exchange of the deletion of a mailbox.

"RemoveExtensionAssignment": the messaging system sends this message to ask the automatic branch exchange to delete the assignment of an extension number to a mailbox.

"AnnouncementCreated": the messaging system sends this message to inform the automatic branch exchange of the creation of an announcement as well as a response to each "Rebuild" message.

"AnnouncementImage": the messaging system sends this message to indicate that the state of an announcement has changed (passage from recorded to erased and vice versa).

"AutoAttendantCreated": the messaging system sends this message to inform the automatic branch exchange of the creation of automatic switchboard, and also sends it in response to each "Rebuild" message.

"StartCallAnswerService": the automatic branch exchange sends this message to initialize an answering service on a given port. The messaging system responds by the "ServiceStarted" or "ServiceRefused" message depending on whether the service is started or not.

"StartVoiceMailService": the automatic branch exchange sends this message to initialize a voice message service on a given port. The messaging system responds by the "ServiceStarted" or "ServiceRefused" message depending on whether the service is started or not.

"StartAutoAttendantService": the automatic branch exchange sends this message to initialize an automatic switchboard service on a given port. The messaging system responds with the "ServiceStarted" or "ServiceRefused" message depending on whether the service has been started or not. "StartAnnouncementService": the automatic branch exchange sends this message to initialize an announcement service on a given port. The messaging system responds with the message "ServiceStarted" or "ServiceRefused" depending on whether the service has been started or not. In the event of a positive response, the switch sends "PlayAnnouncement" messages for the playing of announcements on this port. The messaging system sends the "AnnouncementPlayed" message when the playing has been done. The automatic branch exchange sends a message "StopPlayingAnnouncement" to stop the playing of an announcement on a port.

"StartAdminService": the automatic branch exchange sends this message to start an administrative service on a given port. The messaging system responds with the message "ServiceStarted" or "ServiceRefused" depending on whether the service is started or not.

"RequestStartCallService": the messaging system sends this message to ask for the setting up of a call. The automatic branch exchange sends a message "StartCallService" or "CallServiceRefused" depending on whether the requested call has been set up or not. If the call is set up, the messaging system responds with the message "ServiceStarted" or "ServiceRefused" depending on whether the service has been started or not.

"StopService": the automatic branch exchange sends this message to stop the service during operation. The messaging system responds with the message "ServiceCompleted" indicating that the service is terminated.

"RequestInternalTransfer" or "RequestTransferToOperator": the messaging system sends this message to ask the automatic branch exchange to make a call transfer internally or to an operator respectively. The automatic branch exchange responds with the message "TransferCompleted" or "TransferAborted" depending on whether the transfer has been made or not.

"StartToneDetection": the automatic branch exchange sends this message to stop a detection of tone on a port. The messaging system sends a "ToneDetected" message for each tone detected.

"StopToneDetection": the automatic branch exchange sends this message to stop a detection of tone on a port.

"SendTouchTone": the automatic branch exchange sends this message to ask the messaging system to react as if it has received the specified touch tone (in the context of texts).

"ToneDetected": the messaging system sends this message when a DTMF tone has been detected on a port.

Through these different messages listed in Appendix 1, Appendix 2 of the present description illustrates different examples of sequences of signaling exchanges between the automatic branch exchange and the messaging system implemented during the phase of initialization or the phase of normal operation. These different sequences can easily be interpreted in the light of the explanations preceding the different messages. They shall therefore not be described in detail.

It is clear that many other embodiments of the invention can be envisaged. It is possible especially to provide for several signaling channels between the automatic branch exchange and the messaging system. It is also possible to provide for other types of classes and/or natures of messages.

Furthermore, it must be noted that the same automatic branch exchange can be interconnected to several messaging systems. In this case, it is enough to apply the method according to the present invention for each of the distinct messaging systems interconnected with the automatic branch exchange.

Additionally, although in the illustrative embodiment of the invention the entire system is described, an illustrative embodiment of the invention also relates to an automatic branch exchange of the type that can be interconnected with a messaging system by at least one voice channel so as to implement at least one voice service offered by the messaging system. This automatic branch exchange includes capability of interconnection with the messaging system through at least one signaling channel.

Moreover, the invention also relates to a messaging system of the type providing at least one voice service and capable of being interconnected with an automatic branch exchange by at least one voice channel, so as to implement the at least one voice service. This messaging system including capability of interconnection with the automatic branch exchange by at least one signaling channel, distinct from the at least one voice channel and at least one signaling channel, distinct from the at least one voice channel and at least partly bearing signaling exchanges between the automatic branch exchange and the messaging system.

While the invention has been described with reference to a preferred embodiment, it will be understood by those skilled in the art having reference to the specification and drawings that various modifications and alternatives are possible therein without departing from the spirit and scope of the invention.

APPENDIX I

EXAMPLES OF CLASSSES OF MESSAGE AND ASSOCIATED NATURES OF MESSAGE, DESCRIBED IN A LANGUAGE DEVELOPED BY THE APPLICANT

| Class | Nature of Message | Up/Down | Value |
|---|---|---|---|
| Supervision | SystemReady | Up | 0 |
| | GetHardwareVersion | Down | 1 |
| | HardwareVersion | Up | 2 |
| | GetSoftwareVersion | Down | 3 |
| | SoftwareVersion | Up | 4 |
| | GetPortCount | Down | 5 |
| | PortCount | Up | 6 |
| | AssignTimeslot | Down | 7 |
| System | SystemReconfigured | Up | 0 |
| | Rebuild | Down | 1 |
| | RebuildDone | Up | 2 |
| | GetSystemImage | Down | 3 |
| | SystemImage | Up | 4 |
| | MailboxCreated | Up | 5 |
| | MailboxDeleted | Up | 6 |
| | AnnouncementCreated | Up | 7 |
| | AutoAttendanceCreated | Up | 8 |
| | AutoAttendanceDeleted | Up | 9 |
| | SetPreferences | Down | 10 |
| | UpdateDateAndTime | Down | 11 |

APPENDIX I-continued

EXAMPLES OF CLASSSES OF MESSAGE AND ASSOCIATED NATURES OF MESSAGE, DESCRIBED IN A LANGUAGE DEVELOPED BY THE APPLICANT

| Class | Nature of Message | Up/Down | Value |
|---|---|---|---|
| | ChangeLanguages | Down | 12 |
| | SelectDayOrNightMode | Down | 13 |
| | StartSystem | Down | 14 |
| | RequestCallService | Up | 15 |
| | CallServiceRefused | Down | 16 |
| | FindMailbox | Up | 17 |
| | MailboxFound | Down | 18 |
| | MailboxNotFound | Down | 19 |
| | FindNumberOfMailboxesAssigned | Up | 20 |
| | | Down | 21 |
| | NumberOfMailboxesAssigned | Up | 22 |
| | FindExtensionNumber | Down | 23 |
| | ExtensionNumberFound | Down | 24 |
| | ExtensionNumberNotFound | Down | 25 |
| | EchoMessage | Up | 26 |
| | MessageEchoed | | |
| | DebugMessage | Up | 27 |
| Port | StartAdmitService | Down | 0 |
| | StartAnnouncementService | Down | 1 |
| | StartAutoAttendantService | Down | 2 |
| | StartCallAnswerService | Down | 3 |
| | StartVoiceMailService | Down | 4 |
| | SrartCallService | Down | 5 |
| | ServiceStarted | Up | 6 |
| | ServiceRefused | Up | 7 |
| | StopService | Down | 8 |
| | ServiceCompleted | Up | 9 |
| | PlayAnnouncement | Down | 10 |
| | StopPlayingAnnouncement | Down | 11 |
| | AnnouncementPlayed | Up | 12 |
| | RequestInternalTransfer | Up | 13 |
| | RequestTransferToOperator | Up | 14 |
| | TransferCompleted | Down | 15 |
| | TransferAborted | Down | 16 |
| | SendTouchTone | Down | 17 |
| Mailbox | MailBoxImage | Up | 0 |
| | AssignExtensionToMailbox | Up | 1 |
| | AssignmentAccepted | Down | 2 |
| | AssignmentRefused | Down | 3 |
| | RemoveExtensionAssignment | Up | 4 |
| | FindMailboxExtention | Up | 5 |
| | MailboxExtensionFound | Down | 6 |
| | MailboxExtensionNotFound | Down | 7 |
| Annoucement | AnnouncementImage | Up | 0 |
| Tone Detector | StartToneDetection | Down | 0 |
| | StopToneDetection | Down | 1 |
| | ToneDetected | Up | 2 |

APPENDIX 2

EXAMPLES OF SEQUENCES OF SIGNALLING EXCHANGES BETWEEN THE SWITCH AND THE MESSAGING SYSTEM

| Automatic Branch Exchange | | Messaging System |
|---|---|---|

1. Initialization

| | | |
|---|---|---|
| Reset | → | |
| End of Reset | → | |
| | | . . . system warming up . . . |
| | ← | supervision.SystemReady |
| Supervision.GetHardwareVersion | → | |
| | ← | Supervision.HardwareVersion |
| Supervision.GetPortCount | → | |
| | ← | Supervision.PortCount |
| Supervision.AssignTimeslot(0) | → | |
| . . . | → | |
| Supervision.AssignTimeslot(n) | → | |
| System.Rebuild | → | |
| | ← | System.SystemImage |
| | ← | System.MailboxCreated(0) |
| | ← | Mailbox(0).MailboxImage(0) |
| | ← | . . . |
| | ← | System.MailboxCreated(n) |
| | ← | Mailbox.MailboxImage(n) |
| | ← | System.AnnouncementCreated(0) |
| | ← | Announcement(0).AnnouncementImage |
| | | . . . |
| | ← | System.AnnouncementCreated(n) |
| | ← | Announcement(0).AnnouncementImage |
| | ← | System.AutoAttendantCreated(0) |
| | ← | . . . |
| | ← | System.AutoAttendantCreated(n) |
| | ← | System.RebuildDone |
| System.SetPreferences | → | |
| System.UpdateTimeAndDate | → | |
| System.ChangeLanguages | → | |
| System.SelectDayOrNightMode | → | |
| System.StartSystem | → | |

2. Reconfiguration of the image of the messaging system in the automatic branch exchange

| | | |
|---|---|---|
| | ← | System.SystemReconfigured |
| System.Rebuild | → | |
| | ← | System.SystemImage |
| | ← | System.MailboxCreated(0) |
| | ← | Mailbox(0).MailboxImage(0) |
| | ← | . . . |
| | ← | System.MailboxCreated(n) |
| | ← | Mailbox.MailboxImage(n) |
| | ← | System.AnnouncementCreated(0) |
| | ← | Announcement(0).AnnouncementImage |
| | | . . . |
| | ← | System.AnnouncementCreated(n) |
| | ← | Announcement(0).AnnouncementImage |
| | ← | System.AutoAttendantCreated(0) |
| | ← | . . . |
| | ← | System.AutoAttendantCreated(n) |
| | ← | System.RebuildDone |

3. General Service Management

*3.1. The switch starts a service on a port*

| | | |
|---|---|---|
| Port(x).StartXxxService | → | |
| | ← | Port(x).ServiceStarted |

*3.2. The switch fails to start a service on a port*

| | | |
|---|---|---|
| Port(x).StartXxxService | → | |
| | ← | Port(x).ServiceRefused |

*3.3. The switch stops a service on a port*

| | | |
|---|---|---|
| Port(x).StopService | → | |
| | ← | Port(x).ServiceCompleted(stopped by switch) |

*3.4. The messaging system stops a service on a port*

| | | |
|---|---|---|
| | ← | Port(x).ServiceCompleted(completed) |

*3.5. The messaging system detects a far end disconnect*

| | | |
|---|---|---|
| | ← | Port(x).ServiceCompleted(far end disconnect) |

4. Administration Service

APPENDIX 2-continued

EXAMPLES OF SEQUENCES OF SIGNALLING EXCHANGES BETWEEN THE SWITCH AND THE MESSAGING SYSTEM

| Automatic Branch Exchange | | Messaging System |
|---|---|---|

4.1. Creation of a mailbox

| Port(x).StartAdminService | → | |
| | ← | Port(x).ServiceStarted |
| | | . . . creating mailbox . . . |
| | ← | System.MailboxCreated(y) |
| | ← | Mailbox(y).MailboxImage |
| | | . . . far end disconnect . . . |
| | ← | Port(x).ServiceCompleted(far end disconnect) |

4.2. Assignment of an extension number to a mailbox

| Port(x).StartAdminService | → | |
| | ← | Port(x).ServiceStarted |
| | | . . . user requests assignment of extension number to a mailbox number . . . |
| | | . . . user enters maiilbox number (y) . . . |
| | | . . . user enters extension number (123) . . . |
| | ← | Mailbox.AssignExtensionToMailbox(y, 123) |
| Mailbox.AssignmentAccepted(y, 123) | → | |
| | | . . . far end disconnect . . . |
| | ← | Port(x).ServiceCompleted(far end disconnect) |

4.3. Deletion of a mailbox

| Port(x).StartAdminService | → | |
| | ← | Port(x).ServiceStarted |
| | | . . . deleting a mailbox . . . |
| | ← | System.MailboxDeleted(y) |
| | | . . . far end disconnect . . . |
| | ← | Port(x).ServiceCompleted(far end disconnect) |

4.4. Recording of an announcement

| Port(x).StartAdminService | → | |
| | ← | Port(x).ServiceStarted |
| | | . . . recording of a announcement . . . |
| | ← | Announcement(y).AnnouncementImage |
| | | . . . far end disconnect . . . |
| | ← | Port(x).ServiceCompleted(far end disconnect) |

4.5. Unrecording of an announcement

| Port(x).StartAdminService | → | |
| | ← | Port(x).ServiceStarted |
| | | . . . unrecording of an announcment . . . |
| | ← | Announcement(y).AnnouncementImage |
| | | . . . far end disconnect . . . |
| | ← | Port(x).ServiceCompleted(far end disconnect) |

5. Announcement Service

5.1. Playing announcements

| Port(x).StartAnnouncementService | → | |
| | ← | Port(x).ServiceStarted |
| Port(x).PlayAnnouncement(y) | → | |
| | ← | Port(x).AnnouncementPlayed(y) |
| Port(x).PlayAnnouncement(x) | → | |
| | ← | Port(x).AnnouncementPlayed(x) |
| Port(x).StopService | → | |
| | ← | Port(x).ServiceCompleted(stopped by switch) |

6. Automatic switchboard service

6.1. Starting an automatic switchboard service

| Port(x).StartAutoAttendantService(y) | → | |
| | ← | Port(x).ServiceStarted |
| | | . . . far end disconnect . . . |
| | ← | Port(x).ServiceCompleted(far end disconnect) |

6.2. The switch succeeds in transferring a call

| Port(x).StartAutoAttendantService(y) | → | |
| | ← | Port(x).ServiceStarted |
| | | . . . user requests internal transfer . . . |
| | ← | Port(x).RequestInternalTransfer ("123") |
| Port(x).TransferCompleted | → | |
| | ← | Port(x).ServiceCompleted(service completed) |

APPENDIX 2-continued

EXAMPLES OF SEQUENCES OF SIGNALLING EXCHANGES BETWEEN THE SWITCH AND THE MESSAGING SYSTEM

| Automatic Branch Exchange | | Messaging System |
|---|---|---|
| 6.3. The switch fails to transfer a call | | |
| Port(x).StartAutoAttendantService(y) | → | |
| | ← | Port(x).ServiceStarted |
| | | . . . user requests internal transfer . . . |
| | ← | Port(x).RequestInternal.Transfer("8") |
| Port(x).TransferAborted (call number incorrect) | → | |
| | | . . . user requests transfer to operator . . . |
| | ← | Port(x).RequestTransferToOperator |
| Port(x).TransferCompleted | → | |
| | ← | Port(x).ServiceCompleted(service completed) |
| 7. Call Answer Service | | |
| 7.1. Starting the service without a mailbox number | | |
| Port(x).StartCallAnswerService | → | |
| | ← | Port(x).ServiceStarted |
| | | . . . user enters extension number . . . |
| | ← | System.FindMailbox |
| System.MailboxFound | → | |
| | | . . . deposit of message in mailbox (y) . . . |
| | | . . . far end disconnect . . . |
| | ← | Port(x).ServiceCompleted(far end disconnect) |
| 7.2. Starting the service with a mailbox number | | |
| Port(x).StartCallAnswerService(y) | → | |
| | ← | Port(x).ServiceStarted |
| | | . . . deposit of message in mailbox(y) . . . |
| | | . . . far end disconnect . . . |
| | ← | Port(x).ServiceCompleted(far end disconnect) |
| 7.3. Delivering a message in a mailbox | | |
| Port(x).StartCallAnswerService(y) | → | |
| | ← | Port(x).ServiceStarted |
| | | . . . recording of a new message . . . |
| | ← | Mailbox(y).MailboxImage |
| | | . . . far end disconnect . . . |
| | ← | Port(x).ServiceCompleted(far end disconnect) |
| 8. Voice Mail Service | | |
| 8.1. Starting the service without a mailbox number | | |
| Port(x).StartVoiceMailService | → | |
| | ← | Port(x).ServiceStarted |
| | | . . . user enters extension number . . . |
| | ← | System.FindMailbox |
| System.MailboxFound | → | |
| | | . . . any operations on mailbox (y) . . . |
| | | . . . far end disconnect . . . |
| | ← | Port(x).ServiceCompleted(far end disconnect) |
| 8.2. Starting the service with a mailbox number | | |
| Port(x).StartVoiceMailService(y) | → | |
| | ← | Port(x).ServiceStarted |
| | | . . . any operations on mailbox(y) . . . |
| | | . . . far end disconnect . . . |
| | ← | Port(x).ServiceCompleted(far end disconnect) |
| 8.3. Reading and deleting a message in a mailbox | | |
| Port(x).StartVoiceMailService(y) | → | |
| | ← | Port(x).ServiceStarted |
| | | . . . reading of a new message |
| | ← | Mailbox(y).MailboxImage |
| | | . . . deletion of a new message |
| | ← | Mailbox(y).MailboxImage |
| | | . . . far end disconnect . . . |
| | ← | Port(x).ServiceCompleted(far end disconnect) |
| 9. Call Service | | |
| 9.1. The automatic branch exchange seeks in setting up the call | | |
| | ← | System.RequestCallService |
| Port(x).StartCallService | → | |

APPENDIX 2-continued

EXAMPLES OF SEQUENCES OF SIGNALLING EXCHANGES BETWEEN THE SWITCH AND THE MESSAGING SYSTEM

| Automatic Branch Exchange | | Messaging System |
|---|---|---|
| | ← | Port(x).ServiceStarted |
| | | ... |
| | | ... far end disconnect ... |
| | ← | Port(x).ServiceCompleted(service completed) |
| 9.2. The automatic branch exchange fails to set up the call | | |
| | ← | System.RequestCallService |
| System.CallServiceRefused | → | |
| 10. Tests | | |
|    10.1 Echo message | | |
| System.EchoMessage | → | |
| | ← | System.MessageEchoed |
|    10.2 Debug message | | |
| | | ... |
| | ← | System.DebugMessage |
| | | ... |
| | ← | System.DebugMessage |
| | | ... |

What is claimed is:

1. A system comprising:
a messaging system offering at least a voice service:
   at least one voice channel for coupling the messaging system to an automatic branch exchange so as to implement the at least one voice service; and
   at least one signaling channel, distinct from the at least one voice channel, the at least one signaling channel for coupling the messaging system and the automatic branch exchange, the at least one signaling channel bearing one or more signaling exchanges between the automatic branch exchange and the messaging system, the at least one signaling channel implementing a signaling protocol that comprises an initializing phase, during which the messaging system:
   transfers an image of its current configuration to the automatic branch exchange; and
   receives an image of a current configuration of the automatic branch exchange.

2. The system according to claim 1, wherein the signaling channel is a digital type channel.

3. The system according to claim 1, wherein the signaling protocol comprises a normal phase of operation during which the messaging system implements at least one predetermined signaling exchange.

4. The system according to claim 1, wherein the image of the current configuration of the messaging system and the image of the current configuration of the automatic branch exchange are images according to an object-oriented model.

5. The system according claim 1, further comprising the automatic branch exchange.

6. A system comprising:
a messaging system offering at least a voice service;
   at least one voice channel for coupling the messaging system to an automatic branch exchange so as to implement the at least one voice service; and
   at least one signaling channel, distinct from the at least one voice channel, the at least one signaling channel for coupling the messaging system and the automatic branch exchange, the at least one signaling channel bearing one or more signaling exchanges between the automatic branch exchange and the messaging system, the at least one signaling channel implementing a signaling protocol that comprises signaling messages, the signaling messages comprising:
   a "class" field (31) for enabling the identification of one class in a group of at least one possible class;
   an "instance" field (32) in one of two states, the first state being not defined, and the second state for enabling the identification of a particular instance in a group of at least one possible instance for the identified class in the "class" field;
   a "nature of message" field (33) for enabling the identification of a nature of message from a group of least one nature of message possible for the identified class in the "class" field;
   a "parameter(s)" field (34) in one of two states, the first state being not defined, and the second state for enabling the identification of at least one parameter associated with the nature of message identified in the "nature of message" field.

7. The system according to claim 6, characterized in that the class identified in the "class" field is a class selected form the group consisting of: a "supervision" class, a "system" class, a "port" class a "mailbox" class, a. "announcement" class, a "tone detector" class.

8. A system comprising:
a messaging system offering at least a voice service;
   at least one voice channel for coupling the messaging system to an automatic branch exchange so as to implement the at least one voice service, wherein the at least one voice channel bears one or more signaling exchanges between the automatic branch exchange and the messaging system; and
   at least one signaling channel, distinct from the at least one voice channel, the at least one signaling channel for coupling the messaging system and the automatic branch exchange, the at least one signaling channel bearing one or more signaling exchanges between the automatic branch exchange and the messaging system.

9. A system comprising:

an automatic branch exchange;

at least one voice channel for coupling the automatic branch exchange to a messaging system; and at least one signaling channel, distinct from the at least one voice channel, the at least one signaling channel for coupling the automatic branch exchange and the messaging system, the at least one signaling channel bearing one or more signaling exchanges between the automatic branch exchange and the messaging system, the at least one signaling channel implementing a signaling protocol that comprises an initializing phase, during which the automatic branch exchange:

receives an image of a current configuration of the messaging system; and transfers an image of its current configuration to the messaging system.

10. The system according to claim 9, wherein the signaling channel is a digital type channel.

11. The system according to claim 9, wherein the signaling protocol comprises a normal phase of operation during which the automatic branch exchange implements at least one predetermined signaling exchange.

12. The system according to claim 9, wherein the image of the current configuration of the messaging system and the image of the current configuration of the automatic branch exchange are images according to an object-oriented model.

13. A system comprising:

an automatic branch exchange;

at least one voice channel for coupling the automatic branch exchange to a messaging system; and at least one signaling channel, distinct from the at least one voice channel, the at least one signaling channel for coupling the automatic branch exchange and the messaging system, the at least one signaling channel bearing one or more signaling exchanges between the automatic branch exchange and the messaging system, the at least one signaling channel implementing a signaling protocol that comprises signaling messages, the signaling messages comprising:

a "class" field (31) for enabling the identification of one class in a group of at least one possible class;

an "instance" field (32) in one of two states, the first state being not defined, and the second state for enabling the identification of a particular instance in a group of at least one possible instance for the identified class in the "class" field;

a "nature of message" field (33) for enabling the identification of a nature of message from a group of least one nature of message possible for the identified class in the "class" field;

a "parameter(s)" field (34) in one of two states, the first state being not defined, and the second state for enabling the identification of at least one parameter associated with the nature of message identified in the "nature of message" field.

14. The system according to claim 13, characterized in that the class identified in the "class" field is a class selected form the group consisting of: a "supervision" class, a "system" class, a "port" class a "mailbox" class, a "announcement" class, a "tone detector" class.

15. A system comprising:

an automatic branch exchange;

at least one voice channel for coupling the automatic branch exchange to a messaging system, wherein the at least one voice channel bears one or more signaling exchanges between the automatic branch exchange and the messaging system; and at least one signaling channel, distinct from the at least one voice channel, the at least one signaling channel for coupling the automatic branch exchange and the messaging system, the at least one signaling channel bearing one or more signaling exchanges between the automatic branch exchange and the messaging system.

16. A method of communication between an automatic branch exchange and a messaging system offering at least a voice service, the automatic branch exchange and the messaging system being coupled by at least one voice channel so as to implement the at least one voice service, wherein the method comprises:

transferring signaling exchanges between the automatic branch exchange and the messaging system on at least one signaling channel, the signaling channel being distinct from the at least one voice channel, the signaling channel coupling the automatic branch exchange and the messaging system, the signaling channel implementing a signaling protocol that comprises an initializing phase, wherein the initializing phase includes the step of the messaging system transferring an image of its current configuration to the automatic branch exchange.

17. The method according to claim 16, wherein the signaling channel is a digital type channel.

18. The method according to claim 16, wherein the signaling protocol comprises a normal phase of operation during which the automatic branch exchange and the messaging system implement at least one predetermined signaling exchange.

19. The method according to claim 16, wherein the initializing phase further comprises the step of the automatic branch exchange transferring an image of its current configuration to the messaging system.

20. The method according to claim 19, wherein the image of the current configuration of the messaging system and the image of the current configuration of the automatic branch exchange are images according to an object-oriented model.

21. A method of communication between an automatic branch exchange and a messaging system offering at least a voice service, the automatic branch exchange and the messaging system being coupled by at least one voice channel so as to implement the at least one voice service, wherein the method comprises:

transferring signaling exchanges between the automatic branch exchange and the messaging system on at least one signaling channel, the signaling channel being distinct from the at least one voice channel, the signaling channel coupling the automatic branch exchange and the messaging system, the signaling channel implementing a signaling protocol that comprises signaling messages, the signaling messages comprising:

a "class" field (31) for enabling the identification of one class in a group of at least one possible class;

an "instance" field (32) in one of two states, the first state being not defined, and the second state for enabling the identification of a particular instance in a group of at least one possible instance for the identified class in the "class" field;

a "nature of message" field (33) for enabling the identification of a nature of message from a group of least one nature of message possible for the identified class in the "class" field;

a "parameter(s)" field (34) in one of two states, the first state being not defined, and the second state for enabling the identification of at least one parameter associated with the nature of message identified in the "nature of message" field.

22. The method according to claim 20, characterized in that the class identified in the "class" field is a class selected form the group consisting of: a "supervision" class, a "system" class, a "port" class a "mailbox" class, a "announcement" class, a "tone detector" class.

23. A method of communication between an automatic branch exchange and a messaging system offering at least a voice service, the automatic branch exchange and the messaging system being coupled by at least one voice channel so as to implement the at least one voice service, wherein the method comprises:

transferring signaling exchanges between the automatic branch exchange and the messaging system on at least one signaling channel, the signaling channel being distinct from the at least one voice channel, the signaling channel coupling the automatic branch exchange and the messaging system; and transferring signaling exchanges between the automatic branch exchange and the messaging system on the at least one voice channel.

\* \* \* \* \*